(12) United States Patent
Bobert et al.

(10) Patent No.: US 10,468,855 B2
(45) Date of Patent: Nov. 5, 2019

(54) ARRESTER

(71) Applicant: EPCOS AG, Munich (DE)

(72) Inventors: Peter Bobert, Falkensee (DE); Frank Werner, Berlin (DE)

(73) Assignee: EPCOS AG, München (DE)

( * ) Notice: Subject to any disclaimer, the term of this patent is extended or adjusted under 35 U.S.C. 154(b) by 210 days.

(21) Appl. No.: 15/526,291

(22) PCT Filed: Oct. 23, 2015

(86) PCT No.: PCT/EP2015/074631
§ 371 (c)(1),
(2) Date: May 11, 2017

(87) PCT Pub. No.: WO2016/074909
PCT Pub. Date: May 19, 2016

(65) Prior Publication Data
US 2017/0324221 A1    Nov. 9, 2017

(30) Foreign Application Priority Data
Nov. 11, 2014    (DE) .................. 10 2014 116 440

(51) Int. Cl.
| | |
|---|---|
| *H01T 1/22* | (2006.01) |
| *H02H 9/04* | (2006.01) |
| *H01T 4/12* | (2006.01) |
| *H01T 2/02* | (2006.01) |
| *H01T 1/14* | (2006.01) |
| *H01T 4/10* | (2006.01) |

(Continued)

(52) U.S. Cl.
CPC ................ *H01T 1/22* (2013.01); *H01T 1/14* (2013.01); *H01T 2/02* (2013.01); *H01T 4/10* (2013.01); *H01T 4/12* (2013.01); *H01T 4/16* (2013.01); *H02H 9/041* (2013.01); *H02H 9/043* (2013.01); *H02H 9/06* (2013.01)

(58) Field of Classification Search
CPC .... H01T 1/22; H01T 1/14; H01T 2/02; H01T 4/10; H01T 4/12; H01T 4/16; H02H 9/04; H02H 9/043; H02H 9/06
USPC ....................................................... 361/120
See application file for complete search history.

(56) References Cited

U.S. PATENT DOCUMENTS

| | | |
|---|---|---|
| 4,984,125 A | 1/1991 | Uwano |
| 5,248,953 A | 9/1993 | Honl |

(Continued)

FOREIGN PATENT DOCUMENTS

| | | |
|---|---|---|
| AT | 004508 U1 | 7/2001 |
| CN | 101834435 A | 9/2010 |

(Continued)

*Primary Examiner* — Zeev V Kitov
(74) *Attorney, Agent, or Firm* — Slater Matsil, LLP

(57) ABSTRACT

An arrester is disclosed. In an embodiment, the arrester includes a first electrode, a second electrode, a switching contact, a first discharge space between the first and second electrodes and a short-circuiting mechanism suitable for short-circuiting the first and second electrodes and for switching a state of the arrester, wherein, in a first state, at least one electrode of the first and second electrodes is not electrically conductively connected to the switching contact and, in a second state, the at least one electrode is electrically conductively connected to the switching contact.

14 Claims, 1 Drawing Sheet

(51) Int. Cl.
  *H01T 4/16* (2006.01)
  *H02H 9/06* (2006.01)

(56) References Cited

U.S. PATENT DOCUMENTS

| | | | |
|---|---|---|---|
| 5,712,755 A * | 1/1998 | Glaser | H01Q 1/50 |
| | | | 361/111 |
| 6,518,772 B1 * | 2/2003 | Milkovic | G01R 31/1272 |
| | | | 324/536 |
| 6,795,290 B2 | 9/2004 | Bobert et al. | |
| 7,466,530 B2 | 12/2008 | Bobert et al. | |
| 7,646,577 B1 * | 1/2010 | Takeyoshi | H01R 13/6666 |
| | | | 361/111 |
| 8,203,819 B2 | 6/2012 | Bobert | |
| 8,217,750 B2 * | 7/2012 | Machida | H01T 1/14 |
| | | | 337/1 |
| 2009/0128978 A1 | 5/2009 | Vo et al. | |

FOREIGN PATENT DOCUMENTS

| | | |
|---|---|---|
| DE | 19622461 A1 | 11/1997 |
| DE | 10134752 A1 | 3/2003 |
| DE | 102004025912 A1 | 12/2005 |
| DE | 102008022794 A1 | 8/2009 |
| DE | 202006020737 U1 | 9/2009 |
| JP | 5390936 U | 7/1978 |
| JP | 60124381 A | 7/1985 |
| JP | 60138754 A | 7/1985 |
| JP | 62259371 A | 11/1987 |
| JP | 62259372 A | 11/1987 |
| JP | 1102883 A | 4/1989 |
| JP | 227694 U | 2/1990 |
| JP | 333990 U | 4/1991 |
| JP | 5198243 A | 8/1993 |
| JP | 6290852 A | 10/1994 |
| WO | 8706399 A1 | 10/1987 |

* cited by examiner

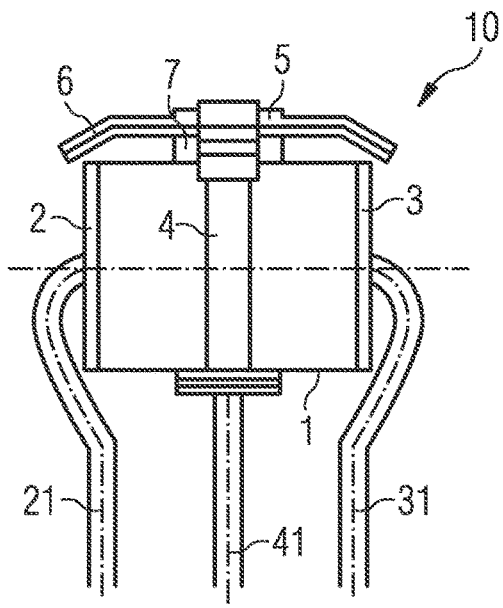
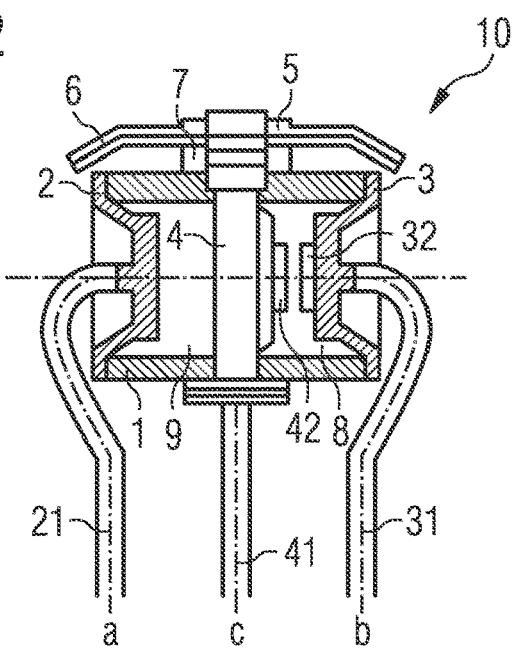
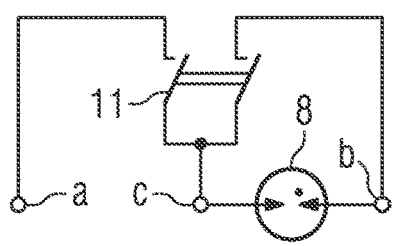

ARRESTER

This patent application is a national phase filing under section 371 of PCT/EP2015/074631, filed Oct. 23, 2015, which claims the priority of German patent application 10 2014 116 440.7, filed Nov. 11, 2014, each of which is incorporated herein by reference in its entirety.

TECHNICAL FIELD

The invention relates to an arrester comprising a first and a second electrode and a switching contact. A short-circuiting mechanism is also provided.

BACKGROUND

Arresters that are used in areas where there is a risk of overloading are equipped with a short-circuiting mechanism, also called a "fail-short," which prevents overheating and hence the risk of fire by virtue of the fact that the arrester is electrically short-circuited.

Upon the response of the short-circuiting mechanism of the arrester in a circuit, a spring contact may be provided on the circuit board having the circuit in order to perform a switching operation at a different location in the circuit. Said spring contact is connected to the arrester under spring tension and is released in the event of overtemperature, with the result that said spring contact is able to make contact when it returns to its rest position.

SUMMARY OF THE INVENTION

Embodiments provide an arrester comprising a first electrode, a second electrode and a switching contact, wherein, in a first state, at least one electrode of the first and the second electrode is not electrically conductively connected to the switching contact and, in a second state, the at least one electrode is electrically conductively connected to the switching contact, a discharge space between the first and the second electrode, and a short-circuiting mechanism, which is suitable for short-circuiting the first and the second electrode and for switching the state.

In various embodiments a third electrode is advantageously embodied as a switching contact: the arrester is provided with a first electrode, a second electrode and a third electrode that is embodied as a switching contact, wherein, in a first state, at least one electrode of the first and the second electrode is not electrically conductively connected to the third electrode and, in a second state, the at least one electrode is electrically conductively connected to the third electrode, a discharge space between the first and second electrode, and a short-circuiting mechanism, which is suitable for short-circuiting the first, second and third electrode and for switching the state.

A sparkover can occur within the discharge space between the first and second electrode if a sparkover voltage between the electrodes is exceeded. A discharge space may also be referred to as a spark gap.

The short-circuiting mechanism has a dual function: it short-circuits the first and second electrode and simultaneously switches the state. This may be affected by virtue of the fact that the short-circuiting of the electrodes also takes place at the same time as the short-circuiting of the switching contact. In this case, there is switching from the first to the second state. This corresponds to a closing switch.

In one configuration, the arrester has an arrester body in which the discharge space is provided. Either the first or the second electrode and the switching contact are arranged on the end sides of the arrester body and the switching contact is arranged outside the discharge space. The discharge space is the region between the first and second electrode. The spark also passes in this region. The discharge space may be delimited by the inner walls of the arrester body and the electrodes.

One of the electrodes may be arranged in a central region of the arrester body, with the result that the discharge space extends from the central region to one of the end sides. An arrester of this kind may be similar in appearance to a three-electrode arrester having one central electrode and two end electrodes, wherein the switching contact is at least similar in shape and position to an end electrode of a three-electrode arrester.

The at least one electrode may be the end-side electrode or the electrode in the central region. The at least one electrode may also comprise both electrodes, which are then either both electrically connected to the switching contact or both electrically isolated therefrom. The first electrode may be arranged on the end side and the second electrode may be arranged in the central region.

The arrester body is preferably made of an insulating, for example, ceramic, material and configured in the shape of a tube or cylinder. The switching contact and the first electrode serve as end-side termination caps on the arrester body.

In one configuration, in the first state, both the first and the second electrode are not electrically conductively connected to the switching contact and, in the second state, both the first and the second electrode are electrically conductively connected to the switching contact, with the result that the connection is effected by means of the triggered short-circuiting mechanism.

Switching from the first to the second state is preferably effected by means of short-circuiting the first and the second electrode.

In one configuration, the arrester comprises a further discharge space in the arrester body between the switching contact and either the first or the second electrode. The separate discharge spaces can thus extend to both end sides from the central region. The discharge space is advantageously closed, that is to say is a space that is completely enclosed by the arrester body and the electrodes.

The further discharge space preferably has a higher ignition voltage than the discharge space, with the result that the arrester function is only available in the discharge space between the first and the second electrode. In contrast, the further discharge space has a dummy function by means of which a two-electrode arrester, formed by the electrodes and the discharge space, gains the appearance of a three-electrode arrester. This allows a short-circuiting mechanism, which is actually intended for a three-electrode arrester, to be used for both switching and short-circuiting.

The discharge space is advantageously filled with gas and sealed in a gas-tight manner, with the result that the ignition properties can be influenced by the choice of a gas or gas mixture.

The further discharge space may be configured to be ventilated, for example, by means of an opening. This increases the sparkover voltage. Other measures for this purpose are likewise conceivable: the spacing of the mutually facing sides of the first and second electrode is smaller than the spacing of the mutually facing sides of the switching contact and the electrode in the further discharge space.

In one configuration, the short-circuiting mechanism comprises a deflected contact, the deflection of which is relaxed by the development of heat and then makes contact with the electrode from which it was previously spaced apart. As a result, the short-circuiting mechanism creates a short-circuit between the electrodes.

The short-circuiting mechanism may comprise an arm, which is suitable for short-circuiting the first and second electrode and the switching contact. A configuration of this kind is also referred to as a short-circuiting link.

An arm of this kind may be deflected by a meltable spacer in such a way that said arm is spaced apart at least from one of the first and second electrode and, after the spacer has melted, said arm short-circuits the first and the second electrode. As long as there is no conductive connection between the electrodes, there are conceivable embodiments in which there is a conductive connection to one of the electrodes, for example, by means of a spacer made of a metal material with a low melting point. As an alternative, a spacer made of a non-conductive material, for example, plastic, may also be provided.

Owing to the movement of the arm, it is possible to achieve a short circuit with the switching contact in the same step by means of the arm. In this case, the arm is deflected by the meltable spacer in such a way that said arm is spaced apart from the switching contact and, after the spacer has melted, said arm short-circuits said switching contact with the electrodes.

The meltable spacer is preferably arranged between the central region of the arm and the electrode in the central region of the arrester body and the ends of the arm, which extend in the direction of the end sides of the arrester body, are spaced apart from the switching contact and the other electrode.

BRIEF DESCRIPTION OF THE DRAWINGS

The invention is illustrated below with the aid of drawings.

FIG. 1 shows a side view of an exemplary embodiment of an arrester.

FIG. 2 shows a sectional view of the exemplary embodiment of the arrester.

FIG. 3 shows an equivalent circuit diagram of the exemplary embodiment of the arrester.

DETAILED DESCRIPTION OF ILLUSTRATIVE EMBODIMENTS

FIG. 1 shows a side view of an exemplary embodiment of an arrester 10. Said arrester has a combination of fail-short and switching contact. The arrester 10 is preferably a gas discharge tube having a discharge space 8 (not illustrated in FIG. 1) filled with gas and serves as a surge arrester for protecting against surge pulses.

The arrester 10 comprises a cylindrical arrester body 1 made of an insulating material. A switching contact 2 and a first electrode 3 are provided on the end sides of said arrester body 1. The switching contact 2 and the first electrode 3 are each designed as an end-side closure cap of the arrester body 1. The outer sides of the switching contact 2 and the first electrode 3, which outer sides terminate the end sides of the arrester body 1, may be formed in a mirror-symmetrical manner.

Both the switching contact 2 and the first electrode 3 may comprise elongated, for example, wire-shaped, connection regions 21, 31 at which the arrester 10 can be contact-connected using solder. A second electrode 4 is provided in a central region of the arrester body 1. Said second electrode also has an elongated, for example, wire-shaped, connection region 41.

The arrester 10 further comprises a short-circuiting mechanism 5 with a deflected arm 6, which is spaced apart from the arrester body 1 by means of a spacer 7, with the result that there is no contact with the switching contact 2 and the first electrode 3. In this exemplary embodiment, the spacer 7 is made of a material with a low melting point, for example, what is known as a solder bead, which is positioned between the second electrode 4 and the central region of the arm 6 in such a way that the ends of the arm 6 are spaced apart from the switching contact 2 and the first electrode 3.

When the spacer 7 melts, a spring force causes the arm to move toward the arrester body 1, to contact the first electrode 3 and the switching contact 2 and therefore to short-circuit the first and second electrode 3, 4 and the switching contact 2. The spring force may arise, for example, by way of a spring component on the arm and/or material elasticity.

The described short-circuiting mechanism 5 makes it possible to switch from a first state, in which the switching contact 2 and the first and the second electrode 3, 4 are not electrically conductively connected, to a second state, in which there is an electrically conductive connection, that is to say a short-circuit, between the switching contact 2 and the electrodes 3, 4.

The short-circuiting mechanism 5 is triggered by an overcurrent and the accompanying development of heat, which leads to melting of the spacer 7.

FIG. 2 shows a sectional view of the exemplary embodiment of the arrester from FIG. 1.

A discharge space 8, which may also be referred to as a spark gap, is provided in the arrester body 1 between the first and second electrode 2, 3. The discharge space 8, which is delimited by the inner walls of the arrester body 1 and the sides 32, 43, facing toward the discharge space, of the first and second electrode 3, 4, is gas-tightly or hermetically sealed and is filled with gas. The sides 32, 43, facing toward the discharge space 8, of the first and second electrode 3, 4 are configured and shaped in such a way that, when the voltage between the two electrodes 3, 4 increases to the sparkover voltage, the resultant electric field leads to ionization of the gas located in the discharge space 8. Said gas becomes conductive and the gap is short-circuited by a spark.

The arrester body 1 comprises a further discharge space 9 between its central region and that of the switching contact 2. Said further discharge space 9 or spark gap is spatially separated from the discharge space 8, with the result that there are two separate spark gaps, between the potential points b-c and the potential points a-c.

The discharge space 8, that is to say the spark gap b-c, fulfills the function of a conventional spark gap, which ignites when the sparkover voltage is exceeded. In contrast, the further discharge space 9, that is to say the spark gap a-c, serves as a dummy without the actual arrester function described above. There is no provision for said further discharge space to ignite. The further discharge space 9 has a very high ignition voltage. It may be designed to be ventilated. This ignition gap corresponds to an open switch. As an alternative or in addition, the second electrode 4 and the switching contact 2 may be designed in such a way that the spacing between them is greater than that between the first and the second electrode 3, 4, as a result of which the sparkover voltage is also greater. When the short-circuiting mechanism is triggered, one side of the arm 6 short-circuits the two-electrode arrester with the first and second electrode 3, 4; the other side of the arm 6 closes the switch and produces a conductive connection to the electrodes 3, 4.

FIG. 3 shows an equivalent circuit diagram of the exemplary embodiment of the arrester.

The potential nodes b, c, between which the arrester 10 is coupled, correspond to the switching contacts 31, 41 of the first and second electrode 3, 4. A switch is coupled between the potential node a, which corresponds to the switching contact 2, and the potential node b. A switch is also coupled between the potential nodes b, c. The switches 11 are coupled to one another in such a way that the connections between the abovementioned potential nodes are either interrupted simultaneously or there is an electrically conductive connection.

The circuit diagram illustrates the functioning of the arrester. If the short-circuiting mechanism is not triggered, the switches 11 are open. The switches 11 close upon triggering of the short-circuiting mechanism.

The external appearance of the arrester 10 and the dimensioning of the parts thereof advantageously correspond to a conventional three-electrode arrester. The switching contact 2 is shaped like one of the external electrodes of the three-electrode arrester. By retaining the design of a three-electrode arrester, short-circuiting mechanisms that are designed for three-electrode arresters can also be used for the described arrester having the function of a two-electrode arrester with switch.

The features of the exemplary embodiments can be combined.

The invention claimed is:

1. An arrester comprising:
a first electrode;
a second electrode;
a switching contact;
a first discharge space between the first and second electrodes;
a second discharge space located in an arrester body between the switching contact and either the first electrode or the second electrode, wherein the second discharge space is ventilated; and
a short-circuiting mechanism suitable for short-circuiting the first and second electrodes and for switching a state of the arrester,
wherein, in a first state, at least one electrode of the first and second electrodes is not electrically conductively connected to the switching contact and, in a second state, the at least one electrode is electrically conductively connected to the switching contact.

2. The arrester according to claim 1, wherein the first discharge space is located in the arrester body, wherein either the first electrode or the second electrode and the switching contact are arranged on end sides of the arrester body, and wherein the switching contact is arranged outside the first discharge space.

3. The arrester according to claim 1, wherein, in the first state, both the first and second electrodes are not electrically conductively connected to the switching contact and, in the second state, both the first and second electrodes are electrically conductively connected to the switching contact.

4. The arrester according to claim 1, wherein the arrester is configured to switch from the first state to the second state by short-circuiting the first and second electrodes.

5. The arrester according to claim 1, wherein the second discharge space has a higher ignition voltage than the first discharge space.

6. The arrester according to claim 1, wherein the first discharge space is sealed in a gas-tight manner and is filled with gas.

7. The arrester according to claim 1, wherein a spacing of mutually facing sides of the first and second electrodes is smaller than a spacing of mutually facing sides of the switching contact and the electrode in the second discharge space.

8. The arrester according to claim 1, wherein the short-circuiting mechanism comprises a deflected contact, a deflection of which is relaxed by development of heat.

9. The arrester according to claim 1, wherein the short-circuiting mechanism comprises an arm, which is suitable for short-circuiting the first and second electrodes and the switching contact.

10. The arrester according to claim 9, wherein the arm is deflected by a meltable spacer in such a way that the arm is spaced apart at least from one of the first and second electrodes, and wherein, after the spacer has melted, the arm short-circuits the first and the second electrodes by spring force.

11. The arrester according to claim 10, wherein the meltable spacer is arranged between a central region of the arm and the electrode in the central region of the arrester body and ends of the arm, which extend in a direction of end sides of the arrester body, are spaced apart from the switching contact and the other electrode.

12. The arrester according to claim 9, wherein the arm is deflected by a meltable spacer in such a way that the arm is spaced apart from the switching contact, and wherein, after the spacer has melted, the arm short-circuits the switching contact with the first and second electrodes.

13. The arrester according to claim 12, wherein the meltable spacer is arranged between a central region of the arm and the electrode in the central region of the arrester body and ends of the arm, which extend in a direction of end sides of the arrester body, are spaced apart from the switching contact and the other electrode.

14. An arrester comprising:
a first electrode;
a second electrode;
a switching contact;
a first discharge space between the first and second electrodes;
a second discharge space having a higher ignition voltage than the first discharge space; and
a short-circuiting mechanism suitable for short-circuiting the first and second electrodes and for switching a state,
wherein, in a first state, at least one electrode of the first and second electrodes is not electrically conductively connected to the switching contact and, in a second state, the at least one electrode is electrically conductively connected to the switching contact.

* * * * *